United States Patent Office 3,505,288
Patented Apr. 7, 1970

3,505,288
HIGH MELTING POLYAMIDES CONTAINING ETHER GROUPS
Ferdinand Bodesheim and Eduard Radlmann, Dormagen, Gunter Blankenstein, Stommeln, Friedrich-Karl Rosendahl, Leverkusen, and Gunter Nischk, Dormagen, Germany, assignors to Farbenfabriken Bayer Aktiengesellschaft, Leverkusen, Germany, a corporation of Germany
No Drawing. Continuation-in-part of application Ser. No. 667,353, Sept. 13, 1967. This application Feb. 17, 1969, Ser. No. 799,946
Claims priority, application Germany, Sept. 19, 1966, F 50,231
Int. Cl. C08g 20/20
U.S. Cl. 260—47                    13 Claims

ABSTRACT OF THE DISCLOSURE

This invention relates to aromatic polyamides having a high melting point prepared from aromatic dicarboxylic acid halides and aromatic diamines containing ether groups, said polyamides being useful in the formation of films, fibers and molded articles.

---

This invention is a continuation-in-part of U.S. Ser. No. 667,353, filed Sept. 13, 1967, now abandoned, and relates to aromatic polyamides of high melting point containing ether groups and to a process for their production by reacting aromatic dicarboxylic acid halides with aromatic diamines containing ether groups. Said reacting is carried out in a polar organic solvent at temperatures between −30 and +100° C., said aromatic dicarboxylic acid halides having the general formula:

X—CO—Ar—CO—X wherein X is a halogen atom and Ar is a bivalent aromatic radical consisting of one or more condensed aromatic radicals or aromatic radicals that are linked together by a single bond or by bridging atoms and said aromatic diamines having the general formula:

H$_2$N—Ar$_2$—O—AR$_1$—O—Ar$_2$—NH$_2$ wherein Ar$_1$ has the meaning of Ar and Ar$_2$ is a bivalent aromatic radical in which the amino group and ether oxygen are in the m- or p-position. The aromatic polyamides show a substantially improved solubility in polar organic solvents.

The production of aliphatic polyamides by ionic or thermal polymerization of lactams, such as pyrrolidone or caprolactam, as well as by condensation of aliphatic diamines with aliphatic dicarboxylic acids other derivatives, is already known. The high molecular weight polyamides prepared by these methods are fusible and can be worked up from the molten state into films, filaments or fibers and molded articles.

Aliphatic polyamides of this type generally melt below 250° C. and in addition have only moderate thermal resistance. Attempts have been made to produce aromatic polyamides in order to obtain products with improved thermostability and higher melting points. Because of the high melting points and infusibility of such aromatic polyamides, they cannot be produced by normal polycondensation. In order to prepare them, one must therefore make use of interface condensation or condensation in solvents, in which aromatic diamines are reacted with aromatic dicarboxylic acid chlorides. In order to obtain a sufficiently high molecular weight, it is in many cases necessary to use tertiary aliphatic amines or soluble inorganic bases such as lithium hydroxide as acid acceptors. Working up of aromatic polyamides produced in this way is in many cases difficult since they can only be dissolved in boiling polar solvents such as N-alkylated pyrrolidones, N-dialkyl acetamide or tetramethylene sulphone in concentrations such that the viscosity of the solution permits production of films or fibers. In practically all cases the presence of a solubilizing agent such as lithium chloride or calcium chloride is also necessary in order to ensure a sufficient concentration of the polymer in the solvent for working up. Frequently, a solubilizing agent must also be added to soluble polymers in order to prevent irreversible gelling of the solution. It is understandable that the properties of polyamide fibers and foils obtainable from such solutions is adversely influenced by the presence of the inorganic constituents. Although the salts can be removed by washing out with water, a certain porosity of the material cannot be prevented. If dimethylformamide is used, which is especially preferred as solvent for the dry spinning process because of its low boiling point, the use of solubilizing agents is essential.

It is an object of the invention to provide new high melting, highly soluble aromatic polyamides comprising the recurring structural unit —NH—Ar$_2$—O—Ar$_1$—O—Ar$_2$—NH—CO—Ar—CO— wherein Ar is a bivalent aromatic radical consisting of one or more condensed aromatic radicals or aromatic radicals that are linked together by a single bond or by bridging atoms, and Ar$_2$ is a bivalent aromatic radical in which the amino group and ether oxygen are in the m- or p-positions and Ar$_1$ is a bivalent aromatic radical consisting of one or more condensed aromatic radicals or aromatic radicals that are linked together by a single bond or by bridging atoms.

It has been found that aromatic polyamides of high melting point and substantially improved solubility in polar organic solvents, especially in dimethylformamide, can be obtained by reacting aromatic dicarboxylic acid halides of the general formula XCO—Ar—CO—X in which X is a halogen atom and Ar is a bivalent aromatic radical consisting of one or more condensed aromatic radicals or aromatic radicals that are linked together by a single bond or by bridging atoms, with aromatic diamines of the general formula NH$_2$—Ar$_2$—O—Ar$_1$—O—Ar$_2$—NH in which Ar$_1$ has the same meaning as Ar, and Ar$_2$ is a bivalent aromatic radical, in which the amino group and the ether oxygen are in the m- or p-positions, at temperatures between −30 and +100° C. in polar solvents, if desired in the presence of an acid acceptor.

The following are examples of suitable dicarboxylic acid halides for the preparation of the new polymers: Naphthalene-1,5-dicarboxylic acid dichloride; diphenyl-4,4′-dicarboxylic acid dichloride; diphenylsulfone-4,4′-dicarboxylic acid dichloride; diphenylether-4,4-dicarboxylic acid dichloride, and especially isophthalic acid dichloride and terephthalic acid dichloride.

In the diamines of the general formula

Ar₂ and Ar₁ may have the following meanings:

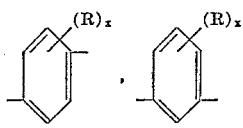

(R=H, alkyl, alkoxy radical, halogen; x=1-4)

—Ar₁—

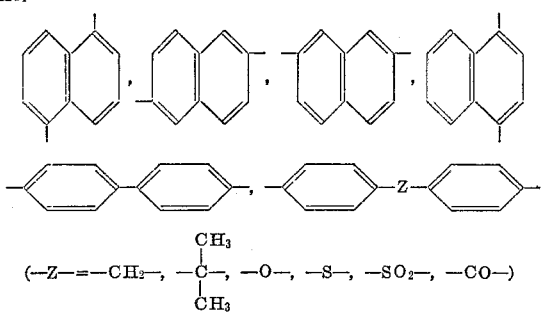

Examples of such amines are 1,5-di-(p-aminophenoxy)-naphthalene; 2,6-di-(p-aminophenoxy) - naphthalene; 4,4'-di-(p-aminophenoxy)-diphenyl; 4,4' - di - (p - aminophenoxy)-diphenylmethane; 4,4' - di - (p-aminophenoxy)-diphenylpropane-(2,2); 4,4 - di - (p - aminophenoxy)-diphenyl ether; 4,4'-di-(p-aminophenoxy)-diphenylsulfide; 4,4'-di-(p-aminophenoxy) - diphenylsulfone; 4,4' - di - (2-chloro-4-aminophenoxy) - diphenylpropane-(2,2), or 1,4-(2-chloro-4-aminophenoxy)-benzene.

The synthesis of the diamines is achieved by reaction of a bis-phenolate with a hydrocarbon containing activated halogen, i.e. a hydrocarbon containing a nitro group in the ortho- or para-position to a halogen atom, in polar organic solvents. The dinitro compounds thus obtained are then hydrogenated with Raney nickel in a method well known in the art to yield the diamino compounds.

Polar solvents that have proved to be especially suitable for condensation of the dicarboxylic acid chlorides with diamines are N-alkylated pyrrolidones such as N-methyl pyrrolidone and N,N'-dialkylsubstituted carboxylic acid amides from the amide of acetic acid upwards, e.g. N,N-dimethyl-acetamide. A special advantage of using these solvents is that no acid acceptors are needed whereas when other polar solvents are used, such as tetramethylene sulfone, the presence of acid acceptors such as tertiary amines or lithium hydroxide is necessary in order to achieve high molecular weights. In a preferred embodiment for the preparation of the new polyamides, the diamine to be used is dissolved in the chosen N-substituted acid amide, and the dicarboxylic acid halide is added in solution or solid form, preferably in equivalent quantities, either all at once or in small portions, with cooling.

Other methods, e.g. the reverse procedure, will of course lead to the same products with high molecular weight and good processing properties. The reaction temperature may lie between —30 and +100° C., temperatures between —10 and +30° C. being preferred. After a certain time, the polymer has been formed with liberation of hydrogen halide. The solids content of the polymer solutions may vary between 5 and 40% and preferably is between 15 and 25%. The polymer is then precipitated by the addition of water or organic solvents. Dilution to a solids content of 15% is especially advantageous, since a fine particulate material is then obtained which can be redissolved more rapidly.

After drying of the precipitated polymers, high molecular weight aromatic polyamides are obtained which dissolve extremely well in dimethylformamide in concentrations of up to 40% and which have inherent viscosities above 0.7. Filaments, fibres and foils which have good mechanical properties and thermostability can be obtained from these solutions by known processes. The solution of the polymer containing hydrohalic acid may also be worked up directly into filaments or foils.

The following examples are to illustrate the invention without limiting it.

EXAMPLE 1

36.8 parts by weight of 4,4'-di-(p-aminophenoxy)-diphenyl are dissolved in 150 parts by weight of dry N-methyl-pyrrolidone and cooled to 0° C. 20.3 parts by weight of isophthalic acid dichloride are now introduced in small portions at 0° C. with stirring. After all the isophthalic acid dichloride has been added, the reaction mixture is stirred for another ½ hour at 0° C., and the cooling bath is then removed.

Stirring is continued for another 4 hours, during which time the viscous solution slowly warms up to room temperature. The solution is then diluted with 200 parts by weight of dimethylformamide, and the polymer is precipitated by pouring the solution into vigorously stirred water. After separation of the polymer by suction filtration, it is washed twice with hot water and dried at 120° C. in vacuo. The colorless polyamide obtained has a melting point above 360° C. and an inherent viscosity of 1.18 (in Examples 1 to 8 measured in a 0.5% by weight solution in N-methylpyrrolidone at 25° C.).

Synthesis of the starting material (a) 4,4'-di-(p-nitrophenoxy - diphenyl.—186.0 parts by weight of 4,4'-dihydroxy-diphenyl are dissolved in 400 parts by weight of dimethylsulfoxide. To this solution is added another solution of 112 parts by weight of potassium hydroxide in 150 parts by weight of water while nitrogen is passed over the solution. Thereafter 200 parts by weight of a mixture of water and dimethylsulfoxide are distilled off in vacuo at 70° C./15 mm. Hg and then 346.5 parts by weight of 4-nitro-chlorobenzene are added in portions. After a condensation time of 8 hours at 130° C., the reaction mixture is cooled to room temperature and poured on ice. The solid material thus obtained is filtered off by suction, washed with water and methanol and dried in vacuo at 50° C.

Yield—362 parts by weight
Melting point—193 to 201° C.

(b) 4,4'-di-(p-aminophenoxy)-diphenyl.—270 parts by weight of 4,4'-di-(p-nitrophenoxy)-diphenyl are dissolved in 1000 parts by weight of N,N-dimethylformamide and hydrogenated for 3 hours at 40° C. and a hydrogen pressure of 45 atmospheres after addition of 15 parts by weight of Raney nickel. After filtering off the catalyst the main portion of the solvent is distilled off in vacuo at 70° C./15 mm. Hg and the diamine is precipitated by pouring the concentrated solution into water. After filtering off the diamine is recrystallized from n-propanol/dioxane and dried in vacuo.

Yield—220.5 parts by weight
Melting point—195 to 197° C.

EXAMPLE 2

36.8 parts by weight of 4,4'-di-(p-aminophenoxy)-diphenyl are dissolved in 265 parts by weight of absolute dimethylacetamide, and after cooling it to 5° C., 34.3 parts by weight of diphenylsulfone-dicarboxylic acid dichloride-(4,4') are introduced slowly with stirring. The cooling bath is removed and the reaction mixture is stirred for a further 5 hours at room temperature. The resulting viscous polymer solution is diluted with 100 parts of dimethylformamide, and worked up as indicated in Example 1. A colorless polyamide is obtained which has an inherent viscosity of 1.24 and a melting point above 360° C.

EXAMPLE 3

82.0 parts by weight of 4,4'-di-(p-aminophenoxy)-diphenylpropane-2,2 are dissolved in 330 parts by weight of absolute N-methylpyrrolidone, and the solution is cooled to −10° C. 40.6 parts by weight of isophthalic acid dichloride are added to the cooled solution with stirring, and stirring is then continued for one hour at −10° C. and 3 hours at room temperature. After dilution with 200 parts by weight of dimethylformamide, the polymer is precipitated by stirring the solution into a mixture of 4 parts by weight of water and 1 part by weight of ethanol, and the polymer is washed with hot water. The colorless polymer obtained is dried at 120° C. in vacuo and has a melting point of 300° C. and an inherent viscosity of 1.12.

Synthesis of the starting material (a) 4,4' - di - (p-nitrophenoxy)-diphenylpropane-(2,2).—114 parts by weight of 4,4'-dihydroxy-diphenylpropane-(2,2) and 173.3 parts by weight of 4-nitrochlorobenzene are dissolved in 400 parts by weight of dimethylsulfoxide. While passing nitrogen over the solution, another solution of 56.0 parts by weight of potassium hydroxide in 150 parts by weight of water is added and condensation is carried out under a continuous stream of nitrogen and while stirring for 8 hours at 100° C. After cooling to room temperature the reaction mixture is poured on ice, the precipitate thus obtained is washed with methanol and dried in vacuo at 50° C.

Yield—195.0 parts by weight
Melting point—108 to 115° C.

(b) 4,4' - di - (p - aminophenoxy) - diphenylpropane-(2,2).—159.5 parts by weight of 4,4'-di-(p-nitrophenoxy)-diphenylpropane-(2,2) are dissolved in 500 parts by weight of N,N-dimethylformamide and are hydrogenated after addition of 16 parts by weight of Raney-nickel as a catalyst at a temperature of 65° C. and a hydrogen pressure of 40 atmospheres for 3 hours. After filtering off the catalyst, a major part of the solvent is distilled off at 70° C./15 mm. Hg and the diamine is precipitated from the concentrated solution by pouring it into water. After filtering by suction, the product is recrystallized from ethanol and dried in vacuo at 50° C.

Yield—122.5 parts by weight
Melting point—131 to 132° C.

EXAMPLE 4

If one adapts the procedure indicated in Example 3 and adds the isophthalic acid dichloride dissolved in 200 parts by weight of absolute N-methylpyrrolidone, the polymer can be precipitated with the water/alcohol mixture after completion of the reaction without further dilution with dimethylformamide. The product obtained is practically identical with the polyamide prepared according to Example 3.

EXAMPLE 5

If the reaction indicated in Example 3 is carried out in a completely analogous manner but with using 40.6 parts by weight of terephthalic acid dichloride instead of isophthalic acid dichloride, a colorless polymer which has an inherent viscosity of 1.06 and a decomposition point of 350° C. is obtained.

EXAMPLE 6

A solution of 43.2 parts by weight of 4,4'-di-(p-aminophenoxy)-diphenylsulfone in 170 parts by weight of dry N-methylpyrrolidone is cooled to 0° C., and while cooling is continued and the mixture stirred, 20.3 parts by weight of isophthalic acid dichloride are introduced at this temperature. The cooling bath is removed after 10 minutes, and stirring is then continued for 4 hours at room temperature. After dilution with 100 parts by weight of di- methylformamide, the polymer is precipitated by stirring the reaction mixture in water, and it is separated by suction filtration and washed with hot water. After drying at 120° C. in vacuo, the colorless polyamide has a melting point of 310° S., and an inherent viscosity of 1.01.

Synthesis of the starting material (a) 4,4' - di-(p-nitrophenoxy)-diphenylsulfone.—125.0 parts by weight of 4,4'-dihydroxy-diphenylsulfone are dissolved in 400 parts by weight of dimethylsulfoxide. This solution is stored under nitrogen and a solution of 56.0 parts by weight of potassium hydroxide in 100 parts by weight of water is added. Thereafter 118 parts by weight of a mixture of dimethylsulfoxide and water are distilled off in vacuo at 70° C./15 mm. Hg. 173.3 parts by weight of 4-nitrochlorobenzene are then added portionwise. Condensation is carried out for 8 hours at 120° C. while nitrogen is passed over the solution. After cooling to room temperature the reaction mixture is poured on ice. The solid material is being filtered off by suction, washed with water and methanol and dried in vacuo at 50°′C.

Yield—202.5 parts by weight
Melting point—174 to 180° C.

(b) 4,4' - di - (p - aminophenoxy) - diphenylsulfone.—20.5 parts by weight of 4,4'-di-(p-nitrophenoxy)-diphenylsulfone are dissolved in 100 parts by weight of N,N-dimethylformamide and hydrogenated, after adding 5 parts by weight of Raney nickel, at 40° C. and a hydrogen pressure of 50 atmospheres for 4 hours. After separating the catalyst, the main portion of the solvent is distilled off in vacuo at 70° C./15 mm. Hg and the concentrated solution thus obtained is poured into about 300 parts by weight of ice water. The diamine which is filtered by suction is washed with methanol, recrystallized from chlorobenzene and dried in vacuo at 50° C.

Yield—19.5 parts by weight
Melting point—188 to 191° C.

EXAMPLE 7

86.4 parts by weight of the amine from Example 6 are dissolved in 450 parts by weight of anhydrous dimethylacetamide and cooled to 0° C. Into the thoroughly stirred solution there are introduced at this temperature 40.6 parts by weight of terephthalic acid dichloride, and stirring is continued at 0° C. until all the acid chloride has been dissolved. The cooling bath is removed and stirring is continued for 4 hours at room temperature and the polymer is then precipitated by stirring it in water. It is dried in vacuo at 120° C., and a polyamide with a slightly yellow tinge is obtained which has an inherent viscosity of 1.12 and a melting point above 360° C.

EXAMPLE 8

96.0 parts by weight of 4,4'-di-(p-aminophenoxy)-diphenylether are dissolved in 550 parts by weight of dimethylacetamide and cooled to −10° C. 50.7 parts by weight of isophthalic acid dichloride are added with thorough stirring, and after removal of the cooling bath stirring is continued for 4 hours at room temperature. 300 parts by weight of dimethylformamide are then added, and the polymer is precipitated by stirring the reaction mixture in a 2:5 mixture of methanol and water. When dried at 120° C. in vacuo, the slightly brownish polyamide has a melting point of 330° C. and an inherent viscosity of 1.07.

Synthesis of the starting material (a) 4,4' - di - (p - nitrophenoxy) - diphenylether.—202 parts by weight of 4,4'-dihydroxydiphenylether are dissolved in 500 parts by weight of dimethylsulfoxide. To this solution another solution of 112 parts by weight of potassium hydroxide in 200 parts by volume of water is added while nitrogen is passed over the solution. 300 parts by volume of water/dimethyl-sulfoxide are distilled off in a water jet vacuum at 75° C. To this mixture are added portionwise 345 parts by weight of 4-nitrochlorobenzene while the mixture is still warm. Thereafter condensation is carried out under nitrogen for 12 hours at 120° C. After cooling to room temperature, the reaction mixture is then poured into ice water and the precipitate thus obtained is filtered off by suction, washed with water until free from chloride ions and thereafter twice boiled with methanol. After drying in vacuo at 65° C., 390 parts by weight of 4,4'-di-(p-nitrophenoxy)-diphenylether are obtained, having a melting point of 167 to 174° C.

(b) 4,4' - di - (p - aminophenoxy) - diphenylether.— A solution of 300 parts by weight of 4,4'-di-(p-nitrophenoxy)-diphenylether in 1500 parts by volume of N,N-dimethylformamide are hydrogenated for 4 hours at 50° C. and a hydrogen pressure of 45 atmospheres after the addition of 20 parts by weight of Raney nickel. After separating off the catalyst, 1000 parts by weight of the solvent are distilled off in a water jet vacuum and the residue is poured into water. The precipitate thus obtained is filtered off by suction and recrystallized from dioxane after the addition of active carbon.

Yield—238 parts by weight
Melting point—172 to 174° C.

EXAMPLE 9

95.8 parts by weight of 4,4'-di-(2-chloro-4-aminophenoxy)-diphenylpropane-(2,2) are dissolved in 432 parts by weight of anhydrous dimethylacetamide, and 40.6 parts by weight of terephthalic acid dichloride are added at −10° C. with stirring. After one hour at 0° C., stirring is continued for 3 hours at 20° C. A sample of the polymer which has been precipitated in water and dried for 5 hours at 100° C. has an inherent viscosity of 0.91 (10 g./l. in dimethylacetamide at 25° C.). The 4,4'-di-(2-chloro-4-aminophenoxy)-diphenylpropane is obtained following exactly the procedure given in Example 3 for 4,4' - di - (p - aminophenoxy) - diphenylpropane - (2,2), but starting with 3,4-dichloronitrobenzene instead of 4-nitrochlorobenzene in the same molar amount.

EXAMPLE 10

40.6 parts by weight of terephthalic acid dichloride are added to 72 parts by weight of 1,4-di-(2-chloro-4-aminophenoxy)-benzene in 350 parts by weight of anhydrous dimethylacetamide at −10° C. The reaction mixture is first stirred for one hour at 0° C. and then for 3 hours at 20° C. A sample of the polymer precipitated in water has, after being dried for 5 hours at 0° C., an inherent viscosity of 1.32 (10 g./l. in dimethylacetamide at 25° C.).

Synthesis of the starting material (a) 1,4 - di - (2 - chloro - 4 - nitrophenoxy) - benzene.—To a suspension of 12 g. of copper powder in 1 liter of tetramethylenesulfone, a solution of 88 g. of sodium hydroxide in 250 ml. of water is added at room temperature. To this mixture a solution of 110 g. of hydroquinone and 384 g. of 3,4-dichloronitrobenzene in 700 ml. of tetramethylenesulfone is added dropwise during 1 hour. Thereafter the mixture is stirred for 4 hours at 110° C. After cooling to room temperature the crystals precipitated and the copper powder are filtered off by suction, washed first with warm water and then with methanol, and dried in vacuo at 50 to 80° C.

Yield—360 g.
Melting point—222 to 224° C.

(b) 1,4 - di - (2 - chloro - 4 - aminophenoxy) - benzene.—200 grams of the 1,4-di-(2-chloro-4-nitrophenoxy)-benzene are (altogether with the copper powder contained therein) dissolved in 700 ml. of dimethylformamide and hydrogenated for 6 hours after addition of 40 g. of Raney nickel at 30° C. and a hydrogen pressure of 50 atmospheres. Thereafter the catalyst and the copper powder are filtered off by suction while warm, and 1 liter of cold water is added to the solution. The crystals thus precipitated are filtered off and dried in vacuo at 60 to 100° C.

Yield—155 g.
Melting point—200 to 201° C.

EXAMPLE 11

29.2 parts by weight of 1,4-di-(4-aminophenoxy)-benzene are dissolved in 130 parts by weight of anhydrous N-methylpyrrolidone and cooled to 0° C. 20.3 parts by weight of isophthalic acid dichloride are introduced in small portions at this temperature with vigorous stirring. When the addition is complete, stirring is continued for another 3 hours and at the same time the reaction mixture is allowed to cool to room temperature. After dilution with dimethylformamide, the polymer is precipitated by stirring it into water, and is dried at 120° C. in vacuo. The resulting polyamide does not melt below 360° C. and has an inherent viscosity of 1.62 determined in an 0.5% by weight solution in N-methylpyrrolidone at 25° C. The 1,4-di-(4-aminophenoxy)-benzene is obtained following exactly the procedure given in Example 10 for 1,4-di-(2-chloro-4-aminophenoxy)benzene, but starting with 4-chloronitrobenzene instead of 3,4-dichloronitrobenzene in the same molar amount.

EXAMPLE 12

46.7 parts by weight of 3-chloro-4,4'-di-(p-aminophenoxy)-diphenylsulfone are dissolved in 180 parts by weight of dry N-methylpyrrolidone and cooled to 0° C. 20.3 parts by weight of isophthalic acid dichloride are added portionwise at this temperature with stirring. The reaction mixture is then stirred for a little while longer at 0° C. and then at room temperature for another 5 hours. The viscous solution is diluted with 200 parts by weight of dimethylformamide and worked up as described in Example 1. The colorless polyamide has a melting temperature of above 360° C. and an inherent viscosity of 1.17 (0.5% by weight solution in N-methylpyrrolidone at 25° C.). The 3-chloro-4,4'-di-(p-aminophenoxy)-diphenylsulfone is obtained following the procedure given in Example 6 for 4,4'-di-(p-aminophenoxy)-diphenylsulfone, but starting with 3,4-dichloronitrobenzene and 4-chloronitrobenzene subsequently instead of 4-chloronitrobenzene alone, each of which is used in half the molar amount.

EXAMPLE 13

A solution of 100.2 parts by weight of 3,3'-dichloro-4,4'-di-(p-aminophenoxy)-diphenylsulfone in 450 parts by weight of anhydrous dimethylacetamide is cooled to 0° C. 40.6 parts by weight of isophthalic acid dichloride are introduced in small portions at this temperature, with stirring. After 30 minutes, the cooling bath is removed and the viscous solution is stirred at room temperature for 4 hours. It is then diluted with 350 parts by weight of dimethylformamide and worked up as described in Example 1. The pale yellow polyamide melts above 330° C. and has an inherent viscosity of 1.06 (measured in an 0.5% by weight solution in N-methylpyrrolidone at 25° C.).

Synthesis of the starting material (a) 3,3'-dichloro - 4,4' - di - (p-nitrophenoxy)-diphenylsulfone.—278.0 parts by weight of 4-nitrophenol are dissolved in 1300 parts by weight of dimethylsulfoxide. While passing nitrogen over the solution, another solution of 112.0 parts by weight of potassium hydroxide in 150 parts by weight of water is added. 300 parts by weight of a mixture of water and dimethylsulfoxide are distilled off in vacuo at 70° C./15 mm. Hg, and then 356 parts by weight of 3,3',4,4' - tetrachloro - diphenylsulfone are added in portions. While continuing the passing over of nitrogen, condensation is carried out for 10 hours at 120° C. After cooling to room temperature, the reaction mixture is poured on ice, the precipitate is filtered off by suction, washed with water and methanol, and recrystallized from ethyleneglycolmonomethylether.

Yield—378.2 parts by weight
Melting point—148 to 150° C.

(b) 3,3'-dichloro - 4,4' - di - (p-aminophenoxy)-diphenylsulfone.— 280.5 parts by weight of 3,3'-dichloro-4,4'-di-(p-nitrophenoxy)-diphenylsulfone are dissolved in 1000 parts by weight of N,N-dimethylformamide and hydrogenated for 4 hours at 50° C. and a hydrogen pressure of 50 atmospheres after addition of 25 parts by weight of Raney nickel. The catalyst is filtered off and the solution is concentrated in vacuo at 70° C./15 mm. Hg. Thereafter the diamine is precipitated by pouring the solution into water. The diamine is filtered off by suction, recrystallized from dioxane/propanol and dried in vacuo at 50° C.

Yield—195.3 parts by weight
Melting point—159 to 163° C.

What is claimed is:

1. A high melting, highly soluble, fiber forming aromatic polyamide consisting essentially of the recurring formula:

—NH—Ar$_2$—O—Ar$_1$—O—Ar$_2$
—NH—CO—Ar—CO— wherein Ar is selected from the group consisting of phenylene, naphthylene, diphenylene, diphenylene sulphone and diphenylene ether, Ar$_2$ is selected from the group consisting of

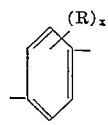

and

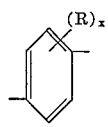

wherein R is H, or chlorine and X is 1–4 and Ar$_1$ is a member selected from the group consisting of

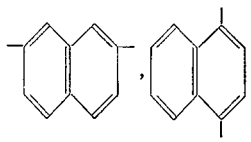

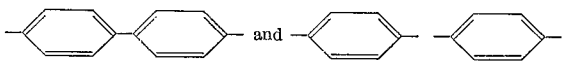

wherein Z is selected from the group consisting of

—CH$_2$—, —C(CH$_3$)$_2$—, —O—, —S—, and —SO$_2$—

2. The polyamide of claim 1 wherein Ar$_1$ is diphenylene and Ar$_2$ is phenylene.
3. The polyamide of claim 1 wherein Ar$_1$ is diphenylenepropane-2,2 and Ar$_2$ is phenylene.
4. The polyamide of claim 1 wherein Ar$_1$ is diphenylenesulfone and Ar$_2$ is phenylene.
5. The polyamide of claim 1 wherein Ar$_1$ is diphenylene ether and Ar$_2$ is phenylene.
6. The polyamide of claim 1 wherein Ar$_1$ is diphenylene and Ar$_2$ is 2-chlorophenylene.
7. The polyamide of claim 1 wherein Ar$_1$ is phenylene and Ar$_2$ is 2-chlorophenylene.
8. The polyamide of claim 1 wherein Ar$_1$ is phenylene and Ar$_2$ is phenylene.
9. The polyamide of claim 1 wherein Ar$_1$ is diphenylenesulfone and Ar$_2$ is phenylene or 3-chlorophenylene.
10. The polyamide of claim 1 wherein Ar$_1$ is diphenylenesulfone and Ar$_2$ is 3-chlorophenylene.
11. The polyamide of claim 1 wherein Ar is meta phenylene.
12. The polyamide of claim 1 wherein Ar is diphenylenesulfone-(4,4').
13. The polyamide of claim 1 wherein Ar is para phenylene.

References Cited

UNITED STATES PATENTS 3,063,966  11/1962  Kwolek et al. _____ 260—78
3,197,434  7/1965   Preston et al. _____ 260—47

WILLIAM H. SHORT, Primary Examiner

L. L. LEE, Assistant Examiner

U.S. Cl. X.R.

260—49, 65, 78, 32.6

UNITED STATES PATENT OFFICE
CERTIFICATE OF CORRECTION

Patent No. 3,505,288 April 7, 1970

Ferdinand Bodesheim et al.

It is certified that error appears in the above identified patent and that said Letters Patent are hereby corrected as shown below:

Column 6, line 5, "310° S." should read -- 310° C. --.

Signed and sealed this 15th day of September 1970.

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,505,288  Dated April 7, 1970

Inventor(s) FERDINAND BODESCHEIM, ET AL.

It is certified that error appears in the above-identified patent and that said Letters Patent are hereby corrected as shown below:

Column 10, Claim 1, group " 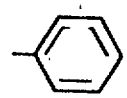 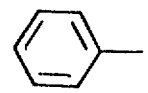 "

should read

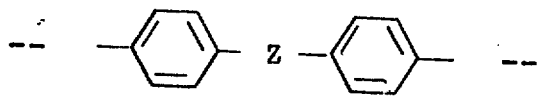

SIGNED AND
SEALED
OCT 20 1970

(SEAL)
Attest:

Edward M. Fletcher, Jr.
Attesting Officer

WILLIAM E. SCHUYLER, JR.
Commissioner of Patents